S. AND D. S. CAMBEROS.
AIR COOLING MACHINE.
APPLICATION FILED AUG. 2, 1917.

1,307,656.

Patented June 24, 1919.

Santiago Camberos S.
David S. Camberos
INVENTORS.

BY
Curtis Doley
ATTORNEYS.

UNITED STATES PATENT OFFICE.

SANTIAGO CAMBEROS AND DAVID S. CAMBEROS, OF TUCSON, ARIZONA.

AIR-COOLING MACHINE.

1,307,656.  Specification of Letters Patent.  Patented June 24, 1919.

Application filed August 2, 1917. Serial No. 184,146.

*To all whom it may concern:*

Be it known that we, SANTIAGO CAMBEROS and DAVID S. CAMBEROS, both citizens of Mexico, residing at Tucson, in the county of Pima and the State of Arizona, have invented a new and useful Air-Cooling Machine, of which the following is a specification.

Our invention relates to improvements in device for the reduction of atmospheric temperature by the use of water or other liquid evaporation, and the objects of our improvements are, first, to obtain a uniform and continuous supply of moisture to a vaporizing area over or through which a flow of air is circulated; second, to provide a vaporizing area whose supply of moisture remains correspondent to any varying flow of air over or through its form of texture; and, third, to assemble these mentioned elements with other mechanisms so as to produce a machine by or through which the temperature of its surrounding atmosphere may be reduced.

We attain these objects by the mechanism illustrated in the accompanying drawing, in which—

Similar numerals refer to similar parts throughout the several views.

Figure 1:
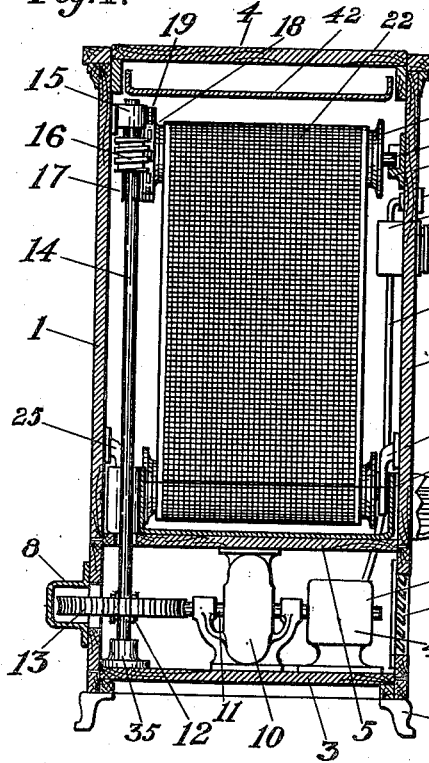
Figure 1 is a vertical section parallel to the front of the machine, and elevation of parts.
Figure 2:
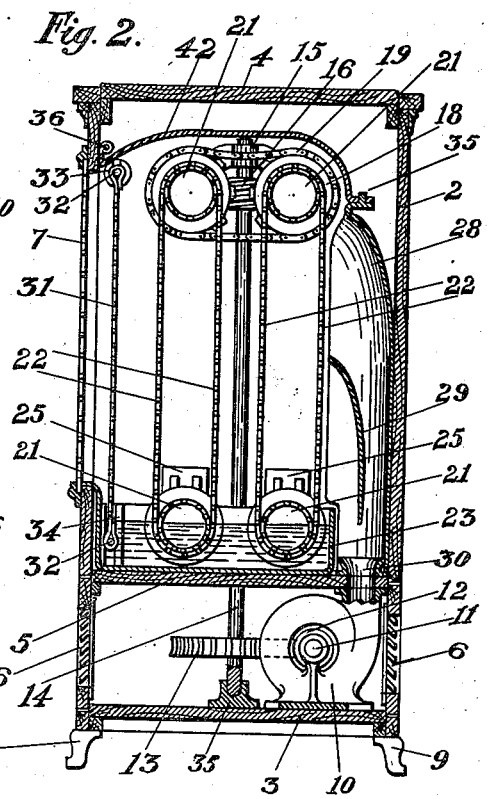
Fig. 2 is a vertical section at right angles thereto.
Figure 3:
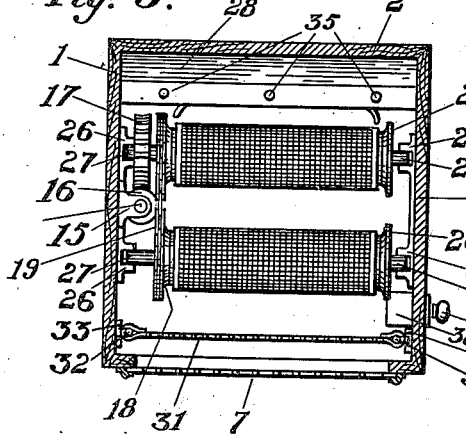
Fig. 3 is a horizontal section and plan of upper parts; and—
Figure 4:
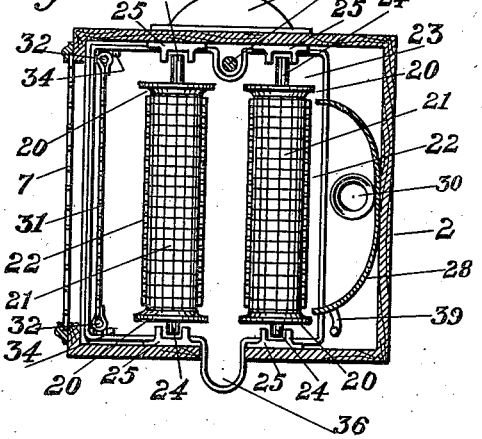
Fig. 4 is a corresponding horizontal section and plan of lower parts.

The sides 1, the back 2, the bottom 3, the top 4, the grilled front 7 and the spur-wheel casing 8 form the inclosures of the machine which rests upon the legs 9. The partition 5 separates the lower or air intake chamber from the vaporizing chamber above, and supports the open tank 23, together with its water or other liquid content which is supplied to the tank through the filling spout 36.

All of the working parts are driven by the motor 41 upon the shaft 11 to which is attached the fan 10 and the worm screw 12. The spur-wheel 13 on the vertical shaft 14, in bearings 15 and 35, engages the worm screw 12. The worm screw 16 on the shaft 14, in turn, engages the spur-wheel 17 on the shaft 27 of the upper rear cylinder 21. The belt or sprocket chain 19 meshes corresponding teeth on the rim of flanges 18 furnishing equal speed and direction of rotation to both upper cylinders 21.

Each of the cylinders 21 is formed of a hollow perforated or open mesh tube or barrel fitted at the ends with flanged plates 18 and 20 to which are attached the projecting carrying shafts 24 and 27, the shafts 27 of the upper cylinders resting in the open bearings 26.

The perforated or fabricated endless evaporating belts 22 extend in width the full length of the perforated or open mesh tube or barrel and are carried and driven by the upper cylinders 21. The lower cylinders 21 rest within the submerged bottom fold of the belts and revolve with the motion of the belts, the shafts 24 being confined to horizontal position by the slotted plates 25 thus permitting the weight of the cylinders to hold the belts tight under all conditions.

Due to the speed reduction of the double set of worm gears, the belts 22 are driven slowly through the water or other liquid contained in the tank 23, the newly wet surfaces rising toward the back of the machine. An air blast generated by the fan 10, drawing its supply of air through the screened openings 6, is forced into the upper chamber through the opening 30 and directed through the perforations or texture of the belts 22 by the reflecting plates 28 and 29 vaporizing and absorbing the moisture thereon or therein contained and exhausting itself into the outside atmosphere through the grilled front 7, the excess moisture being caught and drained back into the tank 23 by the perforated or fabricated screen 31 secured to the frame 32 and suspended in front of the evaporating belts from the slotted flanges 33, the lower edge being held in position within the tank by the slotted cleats 34.

Electric power connection is made at the plug 40. The operating speed of the machine, being regulated by the speed of the motor, is controlled at will by the switch 37, the rheostat 38 and the connecting cable 39.

Although electric power and other agencies are shown in the drawing and mentioned in the specifications, it is obvious that the intent and application of our improvements will not be altered or changed by the substitution of other power and other agencies adaptable to the purposes required.

Special attention is called to the simplicity of all mechanical action and to the absence to all dependency upon capillary action in the material of the vaporizing belts for the continuous supply of moisture to the vaporizing areas; and, also, to the relative and corresponding action of the vaporizing belts to the volume of air circulated over or through them under all speed variations of the machine.

We are aware that prior to our invention machines have been made and used employing the principle of liquid evaporation for the purpose of reducing atmospheric temperature. We therefore do not claim such a principle or combination broadly; but—

We claim:

1. A device for the purpose described, adapted to be used in or before a current of air, and comprising a set of two opposed and parallel perforated tubular barrels horizontally disposed each upon end bearings and arranged so as to rotate thereon, a belt connecting said barrel and causing interaction thereof, and a gear on one of said barrels arranged for power transmission thereto; a set of two corresponding endless belts arranged so as to pass over and hang one from each of said barrels and, by contact therewith, made to travel over its perimeter both in such manner that the lower and free folds pass submerged through a liquid content of an open tank, thus affording and maintaining a supply moisture covering the belts and in quantitative degree relative to the speed of their travel; and a set of two similar perforated tubular barrels horizontally disposed each between vertical end guides, and arranged so as to rotate thereat, and sustained one within each of the lower and free folds of said belts in such manner that they act as adjusters and tension idlers therefor.

2. A device for the purpose described and comprising a set of two opposed and parallel perforated tubular barrels horizontally disposed each upon end bearings and arranged so as to rotate thereon, a belt connecting said barrels and causing interaction thereof, and a gear on one of said barrels arranged for power transmission thereto; a set of two corresponding endless belts arranged so as to pass over and hang one from each of said barrels and, by contact therewith, made to travel over its perimeter both in such manner that the lower and free folds pass submerged through a liquid content of an open tank, thus affording and maintaining a supply of moisture covering the belts and in quantitative degree relative to the speed of their travel; a set of two similar perforated tubular barrels horizontally disposed each between vertical end guides, and arranged so as to rotate thereat, and sustained one within each of the lower and free folds of said belts in such manner that they act as adjusters and tension idlers therefor; and a box composed of two chambers, one chamber inclosing the foregoing described mechanism and provided with a grilled opening at one side, a perforated screen hung on the inside of said opening, and a set of deflectors, and all so contained that a current of air entering said chamber from its opposite chamber through an opening in the dividing partition is directed by said deflectors and caused to circulate through and around said endless belts in such manner that its temperature is reduced by vaporizing action of the moisture thereon, and thus cooled, exhausts through said grilled opening, excessive moisture therein being caught by said screen and returned by gravity to said open tank.

3. A device for the purpose described and comprising a set of two opposed and parallel perforated tubular barrels horizontally disposed each upon end bearings and arranged so as to rotate thereon, a belt connecting said barrels and causing interaction thereof, and a gear on one of said barrels arranged for power transmission thereto; a set of two corresponding endless belts arranged so as to pass over and hang one from each of said barrels and, by contact therewith, made to travel over its perimeter both in such manner that the lower and free folds pass submerged through a liquid content of an open tank, thus affording and maintaining a supply of moisture covering the belts and in quantitative degree relative to the speed of their travel; a set of two similar perforated tubular barrels horizontally disposed each between vertical end guides, and arranged so as to rotate thereat, and sustained one within each of the lower and free folds of said belts in such manner that they act as adjusters and tension idlers therefor; a box composed of two chambers, one chamber inclosing the foregoing described mechanism and provided with a grilled opening at one side, a perforated screen hung on the inside of said opening and a set of reflectors, the other chamber inclosing an electric motor, a fan and a power transmission gear, all interconnected on a shaft, and provided with screened openings on its sides, and all parts and mechanism so arranged within said box that motive power, generated by said motor, is transmitted by intermediate gear to the gear on said barrel and, by direct connection, to said fan; the current of air thus produced is directed by said deflectors and caused to circulate through and around said endless belts in such manner that its temperature is reduced by vaporizing action of the moisture thereon and, thus cooled, exhausts through said grilled opening, excessive moisture therein being caught by said screen and returned by gravity to said open tank.

SANTIAGO CAMBEROS.
DAVID S. CAMBEROS.